United States Patent
Horel et al.

(10) Patent No.: US 7,113,766 B2
(45) Date of Patent: Sep. 26, 2006

(54) TRANSACTION PROCESSING

(75) Inventors: Gerald Horel, Brentwood Bay (CA); Julie Yu, San Diego, CA (US); Phil Nguyen, San Diego, CA (US); Jaiteerth Patwari, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 483 days.

(21) Appl. No.: 10/222,706

(22) Filed: Aug. 15, 2002

(65) Prior Publication Data

US 2004/0032936 A1 Feb. 19, 2004

(51) Int. Cl.
*H04M 11/00* (2006.01)
*H04M 15/00* (2006.01)

(52) U.S. Cl. .................................. 455/406; 379/114.03
(58) Field of Classification Search ........... 379/114.03, 379/114.05, 114.06; 455/405, 406, 414.1, 455/466

See application file for complete search history.

(56) References Cited

U.S. PATENT DOCUMENTS

| 6,226,618 | B1 | 5/2001 | Downs et al. |
| 6,327,574 | B1 | 12/2001 | Kramer et al. |
| 6,334,114 | B1 | 12/2001 | Jacobs et al. |
| 6,334,116 | B1 | 12/2001 | Ganesan et al. |
| 6,434,535 | B1 | 8/2002 | Kupka et al. |
| 2003/0060188 | A1* | 3/2003 | Gidron et al. .............. 455/408 |

* cited by examiner

*Primary Examiner*—Barry Taylor
(74) *Attorney, Agent, or Firm*—Philip R. Wadsworth; Robert J. O'Connell; Christopher S. Chow

(57) ABSTRACT

Systems and methods consistent with the present invention provide a transaction processing during which a transaction billing event is created. Metadata associated with an application is stored in a transaction manager database. When a wireless device downloads an application, raw transaction information is sent to and stored in the database. The raw transaction data may include a subset of the metadata and additional information included by other devices and/or systems. Billing events are created by correlating the metadata and the raw transaction data. In addition, subscription billing events, such as those having reoccurring charges, are calculated by evaluating those transactions having a subscription transaction type and their associated metadata stored in the database.

9 Claims, 5 Drawing Sheets

TRANSACTION PROCESSING

BACKGROUND OF THE INVENTION

I. Field of the Invention

The present invention generally relates to data networks and computer communications across the data networks. More particularly, the invention relates to the processing of transaction data and billing for transactions across a data network.

II. Description of the Related Art

Wireless devices, such as cellular telephones, personal digital assistants ("PDAs"), pagers, laptops with wireless connectivity, etc., communicate packets including voice and data over a wireless network. These wireless devices have installed application programming interfaces ("APIs") onto their local computer platform that allow software developers to create software applications that operate on the wireless device. The API sits between the wireless device system software and the software application, making the wireless device functionality available to the application without requiring the software developer to have the specific wireless device system source code.

The software applications can come pre-loaded at the time the wireless telephone is manufactured, or the user may later request that additional programs be downloaded over cellular telecommunication carrier networks, where the downloaded applications are executable on the wireless telephone. As a result, users of wireless telephones can customize their wireless telephones through the selective downloading of applications, such as games, printed media, stock updates, news, or any other type of information or application that is available for download through the wireless network. In order to manage the cellular telephone resources, the user of the wireless telephone purposefully deletes applications and data from the wireless telephone platform to clear storage space so that new applications can be loaded onto the cleared storage.

In contrast to the larger computer platforms of personal computers and PDAs, wireless devices have limited resources, such as storage and processing, to devote to non-essential applications. Typically, the telecommunication applications have priority of usage of the system resources, with other applications allocated resources as available. The wireless device thus only has a limited capacity for holding all files for applications, and the managing of resources is left up to the discretion of user of the telephone to delete applications to make room for new applications desired downloaded to the wireless device. The wireless device will not otherwise download an application that it does not have the resources to hold and execute.

Applications, and other data, that will be downloaded to a wireless device will require billing processing. Downloading applications, content or other transactions that occur with a wireless device take up resources on a network. A carrier, in the case of a wireless network, will want to record these transactions and bill for it appropriately.

In the case with voice, a carrier only needs to keep track of the amount of time the wireless device is used on the network and bill for the minutes of use. With data, however, the billing paradigm may be different. Carriers may bill for the download or use of a data application separate from how much time it takes on the carrier's network to download the application. To bill for these transactions, the specific transaction will need to be accounted for and billed, not just the amount of time used on the network to perform the transaction.

In addition, with applications, there may be multiple party settlements involved who share in the fee for the billed transaction. For example with an application download transaction, a carrier and a developer may share the download transaction fee incurred by the wireless device. In other cases, such as with downloading content, the carrier, a content provider and/or a third party involved may get part of the fee incurred by the wireless device's use of that content. Consequently, tracking, billing, and maintaining who shares in the fee for the multitude of transactions that occur becomes quite complex. This becomes even more complex when an extremely high number of transactions that may occur on a carrier's network, with thousands, if not millions, of wireless devices performing numerous transactions each.

Therefore, what is needed in the art is a billing method and system to process the transactions that occur over a network.

SUMMARY OF THE INVENTION

Systems and methods consistent with the present invention overcome the shortcomings of existing systems by providing efficient transaction processing. In one embodiment of the present invention, a method for processing a transaction, comprises receiving a first metadata contain a first reference and related to the transaction, receiving a first raw transaction data containing the first reference and related to the transaction, correlating the first metadata and the first raw transaction data using the first reference and creating a billing event by processing the first raw transaction data and the first metadata, wherein the billing event contains billing information associated with the transaction. The method may further comprise receiving a subscription transaction having an associated reoccurring charge and creating a second billing event using a second metadata associated with the subscription transaction, wherein the second billing event includes the reoccurring charge. In addition, the method may further comprise receiving a third metadata contain a third reference and related to a third transaction, receiving a third raw transaction data containing the third reference and related to the third transaction, correlating the third metadata and the third raw transaction data using the third reference, and creating a billing event by processing the third raw transaction data and the third metadata, wherein the billing event contains billing information associated with the transaction and wherein the first raw transaction data is associated with a first entity's network and the third raw transaction data is associated with a third entity's network.

In another embodiment of the present invention, a billing processing server comprises a database for storing metadata, raw transaction data and a billing event, a conversion engine for evaluating the raw transaction data using the metadata, and an interface to extract the billing event for a billing entity. The billing processing server may further comprise a subscription engine for evaluating the metadata associated with a subscription transaction and creating a second billing event based on the metadata associated with the subscription transaction.

In yet another embodiment of the present invention, a method of processing a data transaction in a wireless network comprises receiving raw transaction data containing an application identifier and from an application download server, wherein the raw transaction data identifies information associated with a application download to a wireless device, storing metadata containing an application identifier and associated with the application downloaded to the wireless device, correlating the metadata and the raw transaction data using the application identifier, and creating a billing event containing pricing information associated with the data transaction of downloading an application by processing the raw transaction data and the metadata.

Other objects, advantages, and features of the present invention will become apparent after review of the hereinafter set forth Brief Description of the Drawings, Detailed Description of the Invention, and the Claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention. In the drawings.

DETAILED DESCRIPTION OF THE INVENTION

Figure 1:
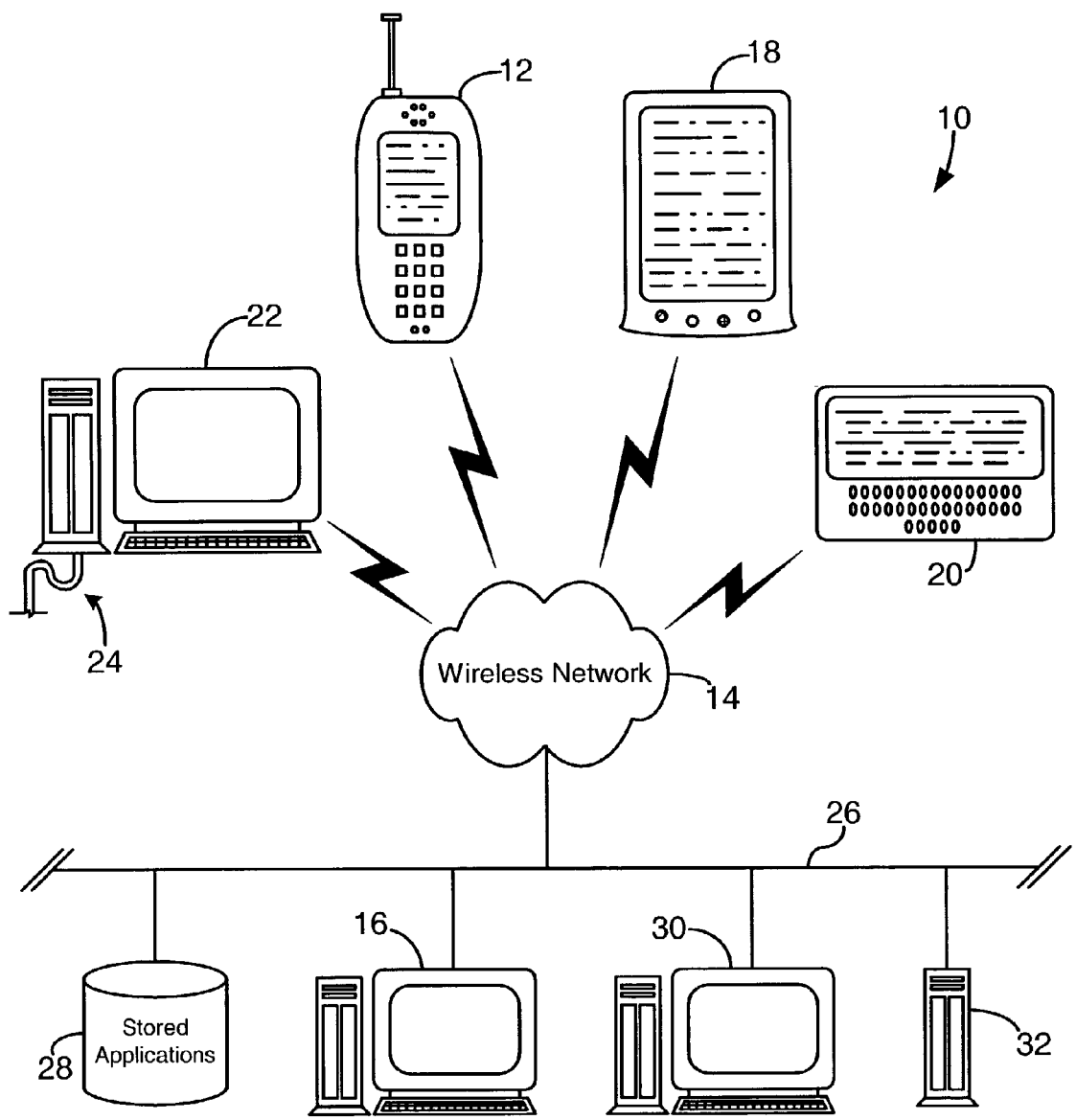
FIG. 1 is a representative diagram of a wireless network and the computer hardware and wireless devices that can be used in an exemplary embodiment of the present invention.

Reference will now be made in detail to the presently exemplary and preferred embodiments of the invention as illustrated in the accompanying drawings, in which like reference characters designate like or corresponding parts throughout the several drawings. The nature, objectives and advantages of the present invention will become more apparent to those skilled in the art after considering the following detailed description in connection with the accompanying drawings.

FIG. 1 is a representative diagram of a wireless network and the computer hardware and wireless devices that can be used in an exemplary embodiment of the present invention. Applications may be downloaded to a wireless device, such as cellular telephone 12, in communication across a wireless network 14 with at least one application download server 16 that selectively transmits software applications and components to wireless devices across a wireless communication portal or other data access to the wireless network 14. As shown here, the wireless device can be a cellular telephone 12, a personal digital assistant 18, a pager 20, which is shown here as a two-way text pager, or even a separate computer platform 22 that has a wireless communication portal, and may otherwise have a wired connection 24 to a network or the Internet. The system can thus be performed on any form of remote module including a wireless communication portal, including without limitation, wireless modems, PCMCIA cards, access terminals, personal computers, access terminals, telephones without a display or keypad, or any combination or sub-combination thereof.

The application download server 16 is shown here on a network 26 with other computer elements in communication with the wireless network 14. There is a second processing server 30, such as a transaction manager discussed below, that can provide separate services and processes to the wireless devices 12,18,20,22 across the wireless network 14 or for the carriers, such as for billing and transaction processing. The second processing server may also interface with other processing servers, such as a carrier billing system, to provide billing, transaction, or other information desired by the other processing servers. There may also at least one stored application database 28 that holds the applications that are downloadable to the wireless devices 12,18,20,22.

Figure 2:
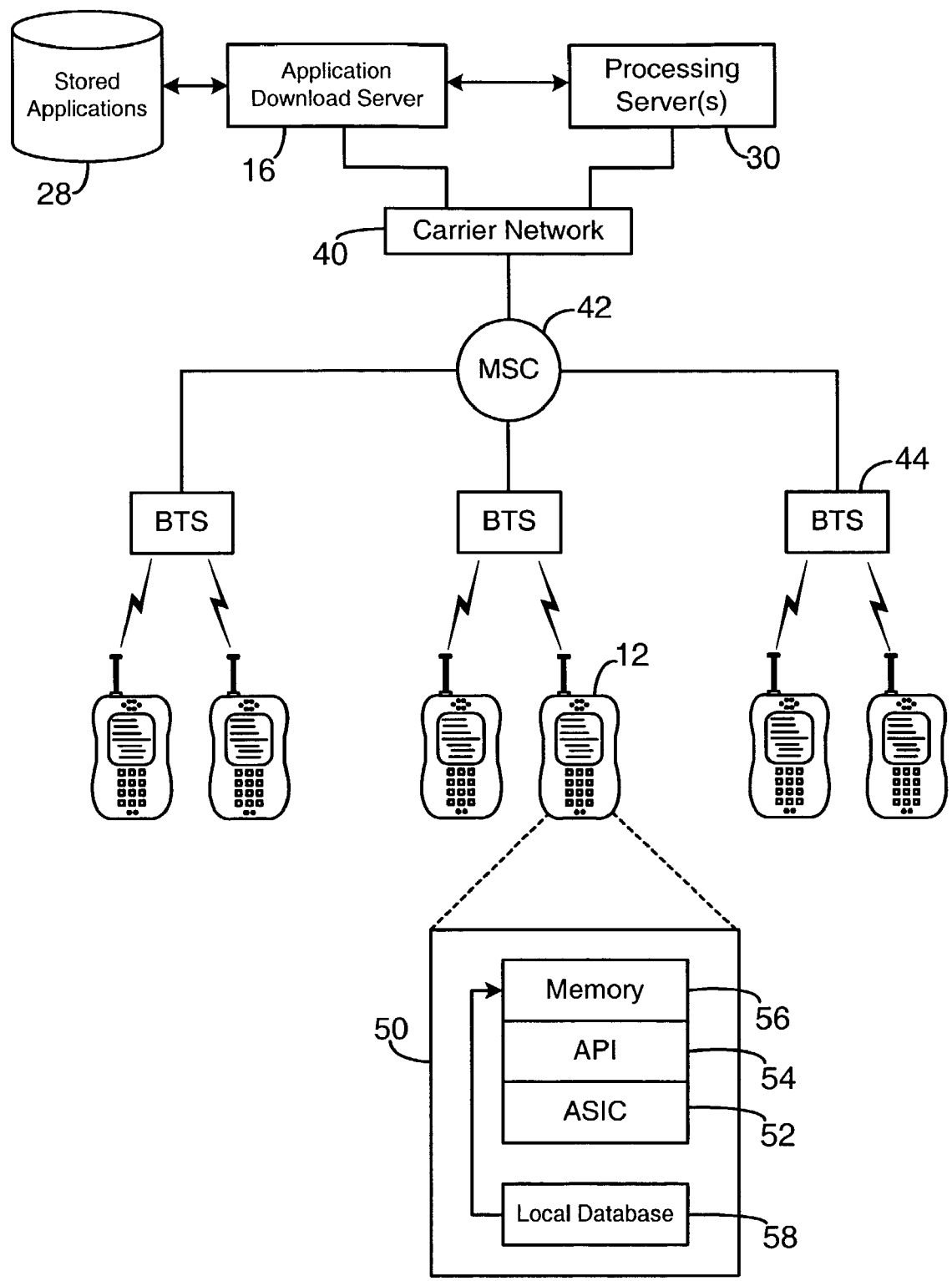
FIG. 2 is a block diagram depicting an hardware architecture of a network supporting downloading of data to a wireless device and transaction processing in an exemplary embodiment of the present invention.

FIG. 2 is a block diagram depicting an hardware architecture of a network supporting downloading of data to a wireless device and transaction processing in an exemplary embodiment of the present invention. The wireless network 14 is merely exemplary and can include any system whereby remote modules, such as wireless devices 12,18,20,22 communicate over-the-air between and among each other and/or between and among components of a wireless network 14, including, without limitation, wireless network carriers and/or servers. The application download server 16 and the stored application database 28, along any other servers such as server 30 which are needed to provide cellular telecommunication services, communicate with a carrier network 40, through a data link, such as the Internet, a secure LAN, WAN, or other network. The carrier network 40 controls messages (sent as data packets) sent to a messaging service controller ("MSC") 42. The carrier network 40 communicates with the MSC 42 by a network, the Internet and/or POTS ("plain ordinary telephone system"). Typically, the network or Internet connection between the carrier network 40 and the MSC 42 transfers data, and the POTS transfers voice information. The MSC 42 is connected to multiple base stations ("BTS") 44. In a similar manner to the carrier network, the MSC 42 is typically connected to the BTS 44 by both the network and/or Internet for data transfer and POTS for voice information. The BTS 44 ultimately broadcasts messages wirelessly to the wireless devices, such as cellular telephone 12, by short messaging service ("SMS"), or other over-the-air methods known in the art.

The wireless device, such as cellular telephone 12, has a computer platform 50 that can receive and execute software applications transmitted from the application download server 16. The computer platform 50 includes an application-specific integrated circuit ("ASIC" 52), or other processor, microprocessor, logic circuit, or other data processing device. The ASIC 52 is installed at the time of manufacture of the wireless device and is not normally upgradeable. The ASIC 52 or other processor executes the application programming interface ("API") layer that interfaces with any resident programs in the memory 56 of the wireless device. The memory can be comprised of read-only or random-access memory (RAM and ROM), EPROM, flash cards, or any memory common to computer platforms. The computer platform 50 also includes a local database 58 that can hold applications not actively used in memory 56. The local database 58 is typically a flash memory cell, but can be any secondary storage device as known in the art, such as magnetic media, EPROM, optical media, tape, or soft or hard disk.

The wireless device, such as cellular telephone 12, accordingly downloads one or more software applications, such as games, news, stock monitors, and the like, and holds the application on the local database 58 when not in use, and uploads stored resident applications on the local database 58 to memory 56 for execution on the API 54 when so desired by the user. However, there are significant cost and size constraints on the wireless device that limit the installed storage capability available in the local database 58 and memory 56, so a limited amount of resident software applications can be held on the wireless device. The ADS may record this transaction and send this transaction data to a process server 30, such as a transaction manager discussed in an embodiment below, to process this transaction for a carrier.

Figure 3:
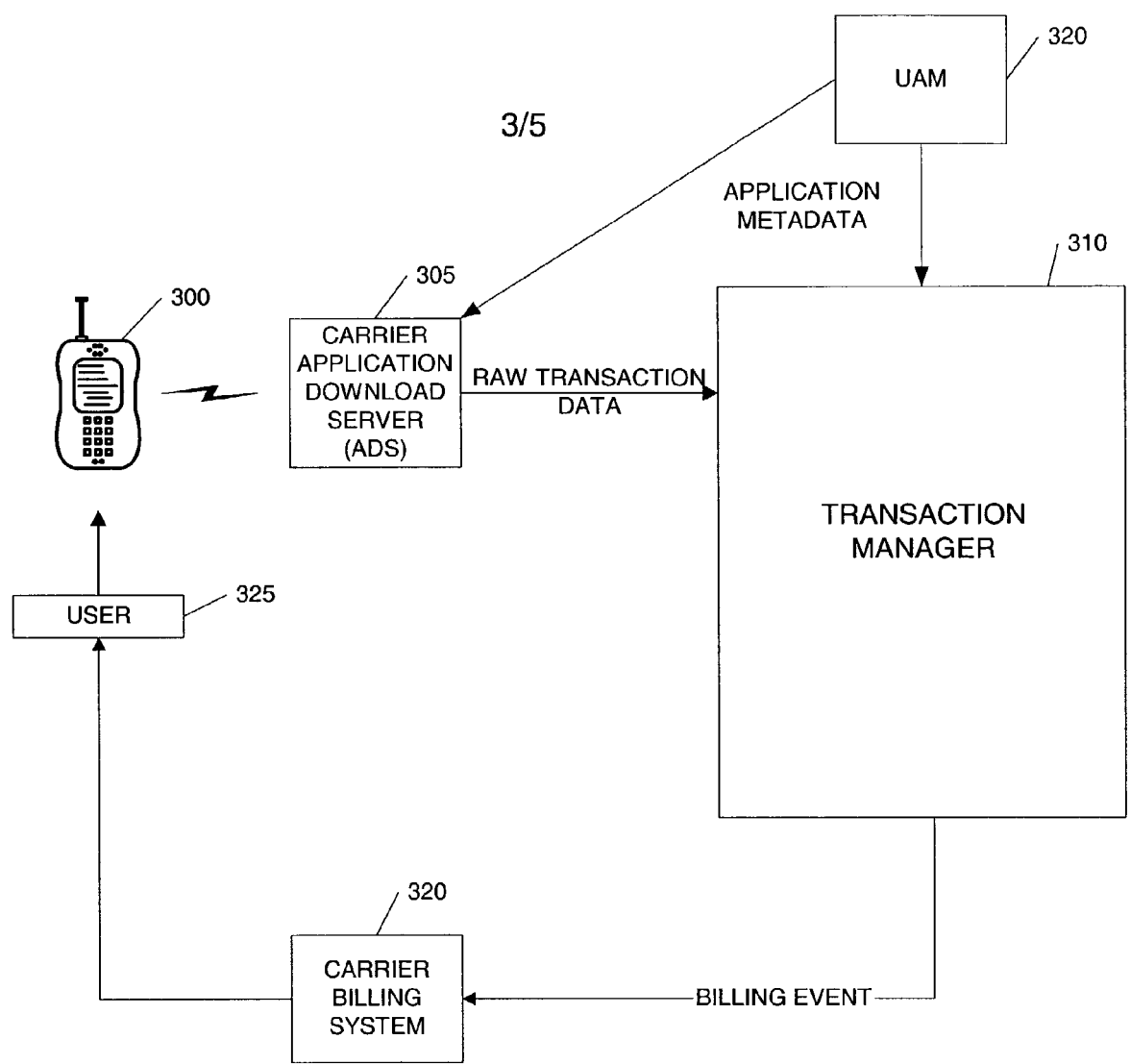
FIG. 3 is a block diagram depicting the environment of transaction processing using a transaction manager and the other external components involved in an exemplary embodiment of the present invention.

FIG. 3 is a block diagram depicting the environment of transaction processing using a transaction manager and the other external components involved in an exemplary embodiment of the present invention. In one embodiment, the wireless device 300 is presented with an option to download an application. This selection process may include presenting the application name to the wireless device, offering one or more pricing plans, such as demo option, allowing the user to demo the application, one or more number of use options (e.g., 5 uses for $1.00 and 10 uses for $1.50), an ongoing subscription option (e.g., application is active until terminated, such as by deleting, by the user). The pricing information is typically information agreed to by the parties associated with offering the application, such as the carrier who's network is downloading the application and the application developer.

When the wireless device 300 selects a pricing plan and downloads an application, this transaction is billed to the user 325, or other responsible party, for this transaction. Many pieces of information are associated with the processing of this transaction including the application itself, the application name or identification, the pricing plan selected, the wireless device that selected the plan, the application developer information, the carrier information.

This information, along with other information related to the transaction or billing processing, is needed and/or desired to process a transaction. Often, however, the wireless device has limited processing power and it is desirable to reduce the amount of information transmitted over the network to the wireless device and in recording the transaction to increase network efficiency. Additionally, if many transactions are taking place, such as in the order of millions, efficiency of limiting network traffic becomes more important.

In one embodiment, these goals are accomplished by having the Unified Application Manager server ("UAM") 320 store much of this information as metadata. Additionally, to aid in processing the transaction, the UAM may use a reference or multiple references, such as an application identifier and a price plan identifier, where each reference is associated with a block of metadata.

Raw transaction data associated with a single transaction may contain many identifiers. In addition, multiple references, e.g., identifiers, may be used to reference multiple blocks of metadata related to a single transaction. For example, an application identifier may be used to reference the application name and associated developer metadata and a price plan identifier may reference usage value, usage type, price method, developer application price, and carrier retail price metadata. Consequently, these references, or identifiers, may be used in recording a transaction and because of the associated metadata, a large quantity of information can be extrapolated about the transaction without having to record this large amount of information as the transaction occurs. The metadata may be stored separately in a database and later processed with the reference numbers to create the billing event.

The following is an example of information that may be associated with a transaction:
Carrier: Carrier ABC
Subscriber ID: 1234567890123
Event ID: 21023066
Timestamp: 05242002 160000
Application Identifier: 101
Application name: Car race
Part Number: QC100001
Part Name: Indy 500
Developer: Developer1
Price Plan Identifier: 102
Developer Application price: $1.00
Carrier Retail Price: $2.00
Usage Value: 5
Usage Type: Number of Uses
Price Method: Purchase (and others may be used to process the transaction).

Note in the above example, the Application identifier (i.e., 101) can be used as a reference for the metadata Application name, Part Number Part Name and Developer. The Price Plan Identifier (e.g., 102) can be used as a reference for the Developer Application Price, Carrier Retail Price, Usage Value, Usage Type and Price Method. Also note, the above is an example of some of the metadata and raw transaction data that can be associated with a transaction and used to create a billing event. Much more information may be desired to associate with a transaction and this desired information may be included in the billing event. This includes information not only used to calculate specific components of billing event but also to aid the processing of the transaction.

A subset of this metadata is sent from the UAM 320 to the ADS 305 to aid in the processing of this transaction. Again, even though a potential large amount of information is desirable in processing a transaction, only a subset of this information needs to be sent across the network to the wireless device in processing this transaction. The UAM 320 also sends metadata to the Transaction Manager 310 to store so that a transaction may be processed. It will be recognized that the amount of metadata sent to the Transaction Manager 310 may be limited only to that needed to process the transaction. In addition, the wireless device or other systems involved with the transaction may add information not contained in the metadata to aid in processing the transaction, e.g., adding the date of the transaction by the wireless device 300 or the ADS 305.

In one embodiment, the wireless device 300 may initiate a transaction by requesting to download an application. It receives the various selection criteria from the ADS 305, including pricing plans, for the application that must be selected. Along with the selection criteria, the wireless device receives the one or more references, such as an application identifier and a price plan identifier, associated with the one or more blocks of metadata. After selecting the various selection criteria associated with downloading an application, the wireless device 300 receives the application from the ADS 305. Having received the application, in one embodiment, is considered a transaction initiating the sending of raw transaction data to the transaction manager. It will be recognized that a transaction can be defined as being one of many events, including the upgrading of application, the delivery of content. Additionally, the time the transfer of information, including applications, is deemed a "transaction" may be different depending on the implementation of the present invention, including when the request was made, when the price was selected, etc.

The wireless device 300 sends the identifiers associated with the application downloaded within the raw transaction data to aid in processing the transaction. This other transaction data may include the subscriber identification, transaction type (e.g., a download transaction type, which may be represented as a reference, such as an Event Type, associated with the transaction type), carrier identification, as well as possibly other information. Keeping the amount of transmitted information at a minimum to record the transaction minimizes the amount of data transmitted over the network to the wireless device and reduces the resource requirement on the systems, including the wireless device, involved with transmitting and receiving this information.

The ADS 305 sends the raw transaction data to the transaction manager 310. The transaction manager 310 creates a billing event, e.g., a complete description of the transaction, to send to the carrier billing system 320 so that the carrier may bill the user 325 for the transaction. The transaction manager will take the raw transaction data received from the ADS 305 and correlate this with the application metadata received from the .UAM 320 to generate the billing event. By keeping the raw transaction data relatively small, the Transaction manager can store transactions as they occur (as being sent by the ADS) at a very high rate and thus can support a very high number of transactions occurring in a short amount of time.

The transaction manager 310, UAM 320, carrier ADS 305, and carrier billing system 320 may incorporate an interface that aids in the transmission of data between these systems. In one embodiment, this interface is an XML interface to simplify the transmitting of data between multiple systems.

After receiving the billable event, the carrier bills the user 325 or whatever party is responsible for paying for the transaction.

Figure 4:
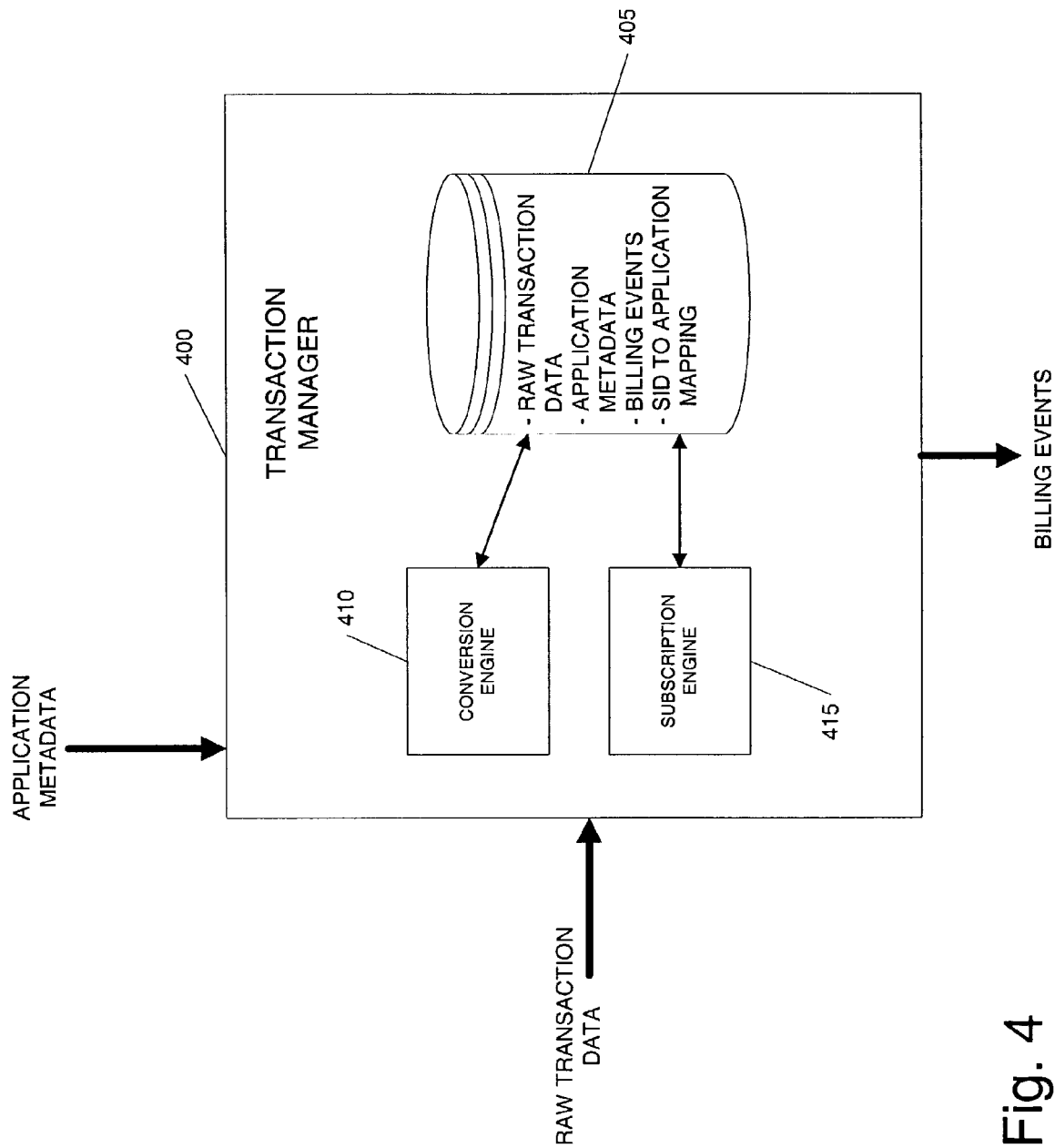
FIG. 4 is a block diagram depicting components of the transaction manager in an exemplary embodiment of the present invention.

FIG. 4 is a block diagram depicting components of the transaction manager 400 in an exemplary embodiment of the present invention. The transaction manager 400 includes a database 405 that stores raw transaction data, the processed billing events, and metadata containing information including application pricing, developer and carrier information.

Application pricing methods may include subscription, purchase, upgrade, demo, and pre-install. Each of these pricing methods may include their own pricing and use parameters.

Raw transaction data may include a subset of the metadata as well as other information added by other devices or systems to aid in the processing of the transaction. The raw transaction data is received into the transaction manager 400 and is stored in the database 405. This raw transaction data includes a reference, such as an application identifier, to the metadata. Using the reference, the transaction manager 400 may retrieve additional information about the transaction that is useful for billing but was not received in the raw transaction data.

A conversion engine 410 uses the raw transaction data and the metadata to determine billable events. Using a reference or multiple references, the conversion engine retrieves the related metadata to develop a complete billing event by mediating the desired information from the raw transaction data, the metadata and performing any desired processing related to the transaction. In one embodiment, the transaction relates to an application download. In this embodiment, one reference may be an application identifier, which is a reference to application metadata stored in a database 405 in the transaction manager.

The transaction manager 400 also creates a mapping of all application downloads and deletes on a wireless device to that wireless device's id (e.g., the subscriber identification (SID)). This mapping can be useful if the need arises to determine which wireless devices have which applications, such as in the event of an application needs to be recalled or upgraded.

The subscription engine 415 processes application subscriptions. A subscription allows an application to be purchased for a periodic fee, such as a monthly fee, and allows multiple uses on an ongoing basis until the subscription is terminated. In one embodiment, the raw transaction data indicates that the application was purchased on a subscription basis. Subscription information may be included as a transaction type in the raw transaction data when the wireless device selects the subscription option.

This subscription information, including any references to metadata, is stored in the database 405. The subscription engine derives billing events by retrieving the subscription transaction data stored in the database and determines whether a billing event needs to be generated on a recurring basis.

The subscription engine derives a billing event by analyzing the subscription transactions and determines if a billing event needs to be generated. For example, an initial download transaction on January 1 may generate a $2.00 billing event by the conversion engine because it received the transaction in the raw transaction data. The next billing event associated with this application download, mainly the bill event indicating a $2.00 charge on February 1 (the monthly subscription charge), is not received in as raw transaction data. Consequently, the subscription engine analyzes the subscription transactions on a periodic basis, such as daily, and determines if another billing event needs to be generated from the subscription transaction. The subscription engine may also use the application metadata to generate the billing event.

Figure 5:
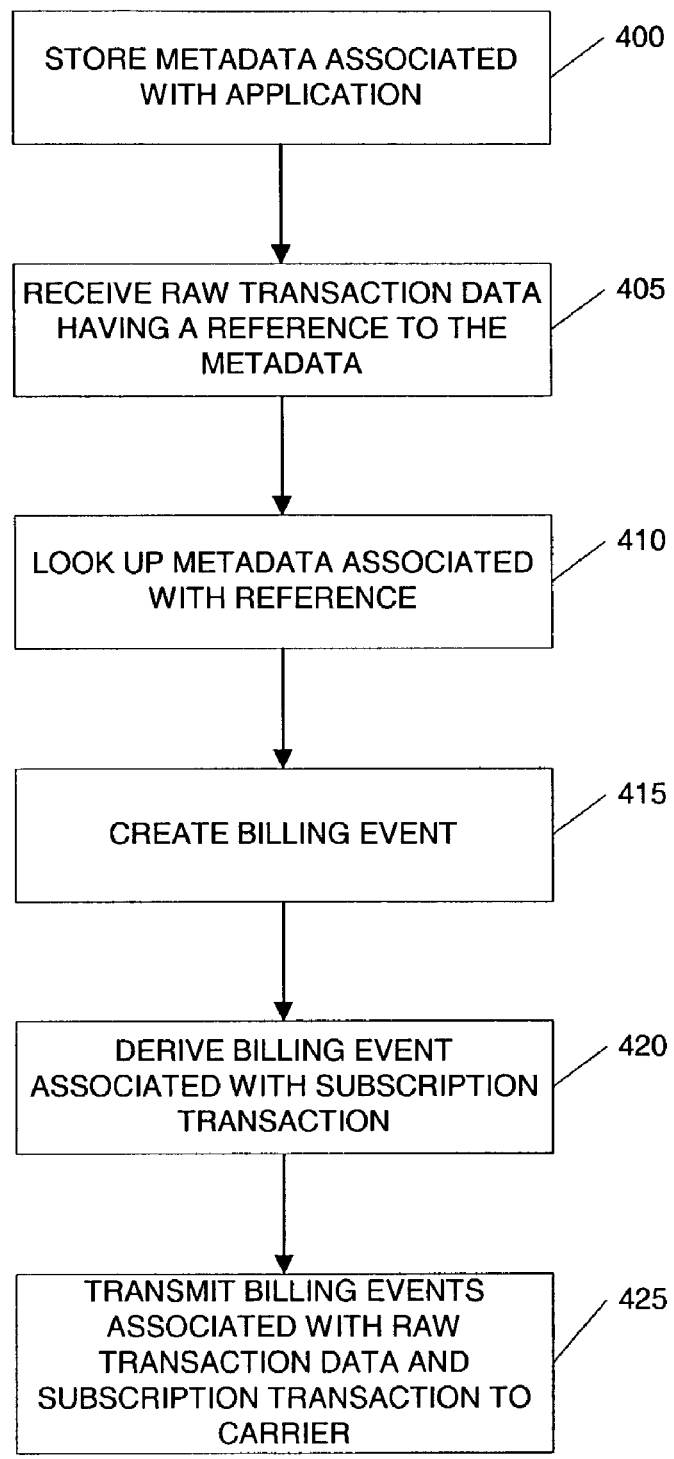
FIG. 5 is a flowchart depicting a method of processing transaction data for a carrier's billing system in an exemplary embodiment of the present invention.

FIG. 5 is a flowchart depicting a method of processing transaction data for a carrier's billing system in an exemplary embodiment of the present invention. The method begins by storing metadata associated with an application (Step 400). A reference, such as an application identifier, is included in the metadata. The metadata may include that information associated with an application that can be useful for billing and transaction processing. The method then receives the raw transaction data having a reference (Step 405). It will be recognized by those skilled in the art that multiple references, each associated with a block of metadata, may be utilized in processing the transaction. The raw transaction data may be a minimal amount of data necessary to record a transaction occurred, such as the reference number, a subscriber identification number of the device on which the transaction occurred, the date of the transaction. It will be recognized that additional information may be desired to include the raw transaction data. This raw transaction data may be stored and acted upon as a separate process. Allowing for storage of the raw transaction data then processing it may allow for the faster transfer of information into the system processing the transactions, therefore allowing it to record a large number of transactions without over burdening the network or system buffers.

The method then uses the reference received in the raw transaction data to look up the associated stored metadata (Step 410). The reference allows the method to associate large amounts of data with one transaction without burdening the devices involved with recording the transaction and transmitting this information around the network.

A billing event is created using the raw transaction data and the metadata (Step 415). The billing event may include that information desired by a carrier to generate a bill to the responsible party of the transaction, such as a user of a wireless device. The billing event may include the raw transaction data, metadata, as well as any processed data. An example of information included in a billing event, include the application name, wireless device subscriber identification, developer information, carrier information, the date the transaction occurred, etc.

The method then creates billing events derived from subscription transactions that were previously stored (Step 420). When the transaction is a subscription, a bill may be incurred on a periodic basis, e.g., monthly, even though only one transaction took place, e.g., one download occurred. Consequently, even though current raw transaction data does not contain a transaction for a subscription billing, a bill may be due because of the monthly charge incurred. The method analyzes the stored subscription transactions, these may be identified because a transaction type may be used to identify the transaction as a subscription transaction. The subscriptions are analyzed to determine if a payment is due on the transaction. If a payment is due, a billing event is created.

The billing events, both generated directly from the raw transaction data and those derived from subscription transactions are transmitted to the carrier's billing system (Step 425).

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but one embodiment of the present invention may be implemented as a combination of hardware and software or in hardware alone. The invention may be implemented with both object-oriented and non-object-oriented programming systems. Additionally, although aspects of the present invention are described as being stored in memory, those skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM.

In addition, it should be noted that various changes and modifications could be made herein without departing from the scope of the invention as defined by the appended claims and their equivalents. Furthermore, although elements of the invention may be described or claimed in the singular, the plural is contemplated unless limitation to the singular is explicitly stated.

What is claimed is:

1. A method for generating a billing event for a download transaction of an application from a download server, wherein generating said billing event requires a first set of information and a second set of information, comprising:
   storing said first set of information as a metadata, said metadata comprising a plurality of blocks;
   responsive to the download transaction conducted by the download server, receiving raw transaction data, said raw transaction data comprising
   a plurality of references to blocks of said metadata, and said second set of information;
   correlating each of said plurality of references in said raw transaction data to retrieve said first set of information from said metadata; and
   creating said billing event from said first and second sets of information.

2. The method of claim 1, further comprising:
   if said download transaction corresponds to a subscription, creating an additional billing event upon each expiration of a subscription period.

3. The method of claim 1, wherein said download transaction comprises downloading said application from said download server over a wireless network.

4. The method of claim 3, further comprising:
   sending said billing event to a carrier which manages said wireless network.

5. The method of claim 1, wherein said first set of information comprises a set including at least one of:
   a carrier identifier;
   a subscriber identifier;
   an event identifier associated with the download transaction;
   a timestamp associated with the download transaction;
   an application identifier associated with the application;
   an application name associated with the application;
   a part number associated with the application;
   a part name associated with the application;
   a developer identifier associated with the application;
   a price plan identifier associated with the application;
   a developer pricing information associated with the application;
   a carrier pricing information associated with the application;
   a usage value associated with the application;
   a usage type associated with the application; and
   a pricing method associated with the application.

6. A machine readable medium storing a sequence of machine executable instruction, which when executed, causes a machine which generates a billing event for a download transaction of an application from a download server, wherein generating said billing event requires a first set of information and a second set of information, to perform a sequence of steps comprising:
   storing said first set of information as a metadata, said metadata comprising a plurality of blocks;
   responsive to the download transaction conducted by the download server, receiving raw transaction data, said raw transaction data comprising
   a plurality of references to blocks of said metadata, and said second set of information;
   correlating each of said plurality of references in said raw transaction data to retrieve said first set of information from said metadata; and
   creating said billing event from said first and second sets of information.

7. The machine readable medium of claim 6, wherein said sequence of steps further comprises:
   if said download corresponded to a subscription over a plurality of periods, creating an additional billing event upon each expiration a period from of said plurality of periods.

8. A billing system for generating a billing event for a download transaction of an application from a download server, wherein generating said billing event requires a first set of information and a second set of information, the system comprising:

a first system for receiving said first information and for storing said first information as a metadata, said metadata comprising a plurality of blocks;

a second system, said second system comprising:
　a storage device; and
　a conversion engine, coupled to said storage device, wherein said conversion engine:
　　receives raw transaction data generated by the download server responsive to the download transaction, said raw transaction data comprising
　　　a plurality of references to blocks of said metadata, and
　　　said second set of information;
　　said conversion engine stores said raw transaction data and said second set of information on said storage device;
　　said conversion engine correlates each of said plurality of references with said first system to retrieve said first set of information from said first system; and
　　said conversion engine generates a billing event based on said first and second set of information.

9. The billing system of claim 8, wherein said second system further comprises:
　a subscription engine, said subscription engine coupled to said storage device;
　　wherein said subscription engine generates additional billing event upon each expiration of a subscription period when said raw transaction data corresponded to a download of said application on a subscription basis.

* * * * *